(12) United States Patent
Nanda et al.

(10) Patent No.: US 8,555,083 B1
(45) Date of Patent: Oct. 8, 2013

(54) SYSTEMS AND METHODS FOR PROTECTING AGAINST UNAUTHORIZED ACCESS OF ENCRYPTED DATA DURING POWER-MANAGEMENT MODES

(75) Inventors: Susanta Nanda, Los Angeles, CA (US); Kent Griffin, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 502 days.

(21) Appl. No.: 12/842,023

(22) Filed: Jul. 22, 2010

(51) Int. Cl.
- *G06F 12/14* (2006.01)
- *G06F 1/00* (2006.01)
- *G06F 1/26* (2006.01)

(52) U.S. Cl.
USPC ............ 713/189; 726/1; 726/2; 726/3; 726/6; 726/9; 726/26; 726/28; 726/30; 726/34; 726/36; 713/300; 380/277; 380/278

(58) Field of Classification Search
USPC ........... 713/189, 320, 324, 300; 726/1, 34, 36
See application file for complete search history.

(56) References Cited

U.S. PATENT DOCUMENTS

| | | | |
|---|---|---|---|
| 4,864,615 A * | 9/1989 | Bennett et al. ................ | 380/239 |
| 5,586,333 A * | 12/1996 | Choi et al. .................... | 713/320 |
| 6,347,202 B1 * | 2/2002 | Shishizuka et al. ............ | 399/75 |
| 8,175,276 B2 * | 5/2012 | Tkacik et al. .................. | 380/277 |
| 2003/0171095 A1 * | 9/2003 | Fujinami ...................... | 455/3.04 |
| 2005/0254658 A1 * | 11/2005 | Brown et al. ................. | 380/286 |
| 2005/0278778 A1 * | 12/2005 | D'Agostino et al. ............ | 726/5 |
| 2008/0235518 A1 * | 9/2008 | Chen et al. ................... | 713/189 |
| 2009/0063877 A1 * | 3/2009 | Lewis et al. .................. | 713/310 |
| 2009/0164613 A1 * | 6/2009 | Saillet .......................... | 709/223 |
| 2010/0266132 A1 * | 10/2010 | Bablani et al. ................ | 380/286 |
| 2010/0296651 A1 * | 11/2010 | Tkacik .......................... | 380/44 |
| 2011/0087896 A1 * | 4/2011 | Thom et al. ................... | 713/193 |
| 2012/0131686 A1 * | 5/2012 | Risan et al. ................... | 726/32 |

OTHER PUBLICATIONS

All Business—A D&B Company; Laptops and Airport Security; www.allbusiness.com, Nov. 19, 2008.
IBM; Feature Codes for IBM Full Disk Encryption Standby CoD Disk Drives; http://publib.boulder.ibm.com; 2004.
gmgDesign.com; Hardware Attack Bypasses Full Disk Encryption (FDE); Garrett M. Groff's Personal Blog; Feb. 21, 2008.
Dmitry Obukhov; Q Concerning Hardware-Based Encryption/Security; http://www.mail-archive.com/fde@www.xml-dev.com/msg01012.html; Jul. 15, 2009.
Moments FDE Drive—Concerns About Usability and Security; http://forums.seagate.com; Jul. 5, 2009.

* cited by examiner

*Primary Examiner* — Christopher Brown
*Assistant Examiner* — Jenise Jackson
(74) *Attorney, Agent, or Firm* — ALG Intellectual Property, LLC (57) ABSTRACT

A method may include detecting initiation of a power-management mode that suspends the functionality of at least one component of a computing device while maintaining the functionality of the device's memory. The method may also include, before the device enters the power-management mode, (1) identifying, within the device's memory, an encryption key that is required to access encrypted data stored in the device's storage device, and (2) removing the encryption key from the device's memory in order to protect against unauthorized access of the encrypted data during implementation of the power-management mode. The method may also include, upon detecting discontinuation of the power-management mode, (1) obtaining user credentials from a user of the device in order to authenticate the user and, upon successfully authenticating the user, (2) using the user credentials to regenerate the encryption key in order to enable access to the encrypted data stored in the storage device.

19 Claims, 6 Drawing Sheets

SYSTEMS AND METHODS FOR PROTECTING AGAINST UNAUTHORIZED ACCESS OF ENCRYPTED DATA DURING POWER-MANAGEMENT MODES

BACKGROUND

Hundreds of thousands of computing devices are lost or stolen each year. For example, more than 600,000 laptops are reportedly lost or stolen each year in U.S. airports alone. Although many computing devices utilize encryption techniques (such as full disk encryption) in an attempt to prevent data stored on lost or stolen computing devices from being compromised, these encryption techniques may be unable to fully secure onboard data if a computing device is lost or stolen while in a power-saving or power-management mode.

For example, during some power-management modes (e.g., sleep states S1, S2, and S3), a computing device may preserve an encryption key within memory (such as random-access memory) located on the computing device. The encryption key may enable the computing device to encrypt and decrypt data stored in a storage device (such as a disk storage device) located on the computing device. Since the encryption key may remain within memory during some power-management modes, an attacker may be able to access the encryption key stored in memory and use the same to decrypt the encrypted data stored in the storage device.

Such a vulnerability may significantly weaken system security by potentially compromising sensitive information stored on lost or stolen computing devices. As such, the instant disclosure identifies a need for effectively protecting against the unauthorized access of encrypted data stored on a computing device while the device is in a power-saving or power-management mode.

SUMMARY

As will be described in greater detail below, the instant disclosure generally relates to systems and methods for protecting against the unauthorized access of encrypted data stored on a computing device while the device is in a power-saving or power-management mode. In essence, the systems and methods described herein may extend the protection afforded by full disk encryption (or similar techniques) to power-saving or power-management modes, potentially ensuring that lost or stolen computing devices do not result in compromised data.

In one example, the systems described herein may accomplish such a task by detecting initiation of a power-management mode (such as sleep state S1, S2, or S3) that suspends the functionality of at least one component of a computing device (such as a central processing unit) while maintaining the functionality of the computing device's memory. Before the computing device enters the power-management mode, the systems described herein may then (1) identify an encryption key stored within the computing device's memory that is required to access encrypted data stored in a storage device of the computing device and then (2) remove the encryption key from the computing device's memory in order to protect against unauthorized access of the encrypted data during implementation of the power-management mode. Upon detecting discontinuation of the power-management mode, the systems described herein may then re-authenticate a user of the computing device before allowing access to the encrypted data stored in the computing device's storage device by (1) obtaining user credentials (such as a password, personal identification number, or smart card data) from the user and then, upon successful authentication of the user, (2) using the user credentials to regenerate the encryption key in order to enable access to the encrypted data stored in the storage device.

In some examples, the systems described herein may provide a low-level filter driver that is configured to (1) intercept read/write operations directed to the storage device and (2) use the encryption key to perform at least one cryptographic transformation during such read/write operations. In one example, the systems described herein may remove the encryption key from the computing device's memory by causing the low-level filter driver to overwrite the encryption key with zeros.

In certain examples, the systems described herein may ensure that all software processes necessary to authenticate the user and unlock the computing device are stored within the computing device's memory before the computing device enters the power-management mode, which in turn allows the systems disclosed herein to re-authenticate the user without accessing the computing device's underlying storage device. For example, the systems described herein may, prior to implementation of the power-management mode, store all software processes within the computing device's memory that are necessary to enable the computing device to (1) authenticate the user and (2) regenerate the encryption key.

The systems described herein may also reduce the working set size of all non-critical processes within the computing device's memory before the computing device enters the power-management mode, thus ensuring that all non-critical memory pages are stored in encrypted form on the computing device's storage device. For example, the systems described herein may, prior to implementation of the power-management mode, remove (or simply reduce the working set size of) any software process from the computing device's memory that is not required to enable the computing device to (1) implement the power-management mode, (2) authenticate the user, (3) regenerate the encryption key, and/or (4) restore the computing device to a system state experienced by the computing device prior to initiation of the power-management mode.

As will be described in greater detail below, by removing an encryption key required to access encrypted data from a computing device's memory before the computing device enters a power-management mode, the systems and methods described herein may protect against the unauthorized access of encrypted data stored on the computing device while the device is in the power-management mode. As a result, the systems and methods described herein may increase the value and effectiveness of security software by thwarting illegitimate attempts to access onboard encryption keys (and encrypted data associated with the same) while computing devices are implementing power-management modes, potentially ensuring that lost or stolen computing devices do not result in compromised data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for protecting against the unauthorized access of encrypted data stored on a computing device while the device is in a power-saving or power-management mode. The following will provide, with reference to FIGS. 1-2, detailed descriptions of exemplary systems for protecting against unauthorized access of encrypted data during power-management modes. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

Figure 1:
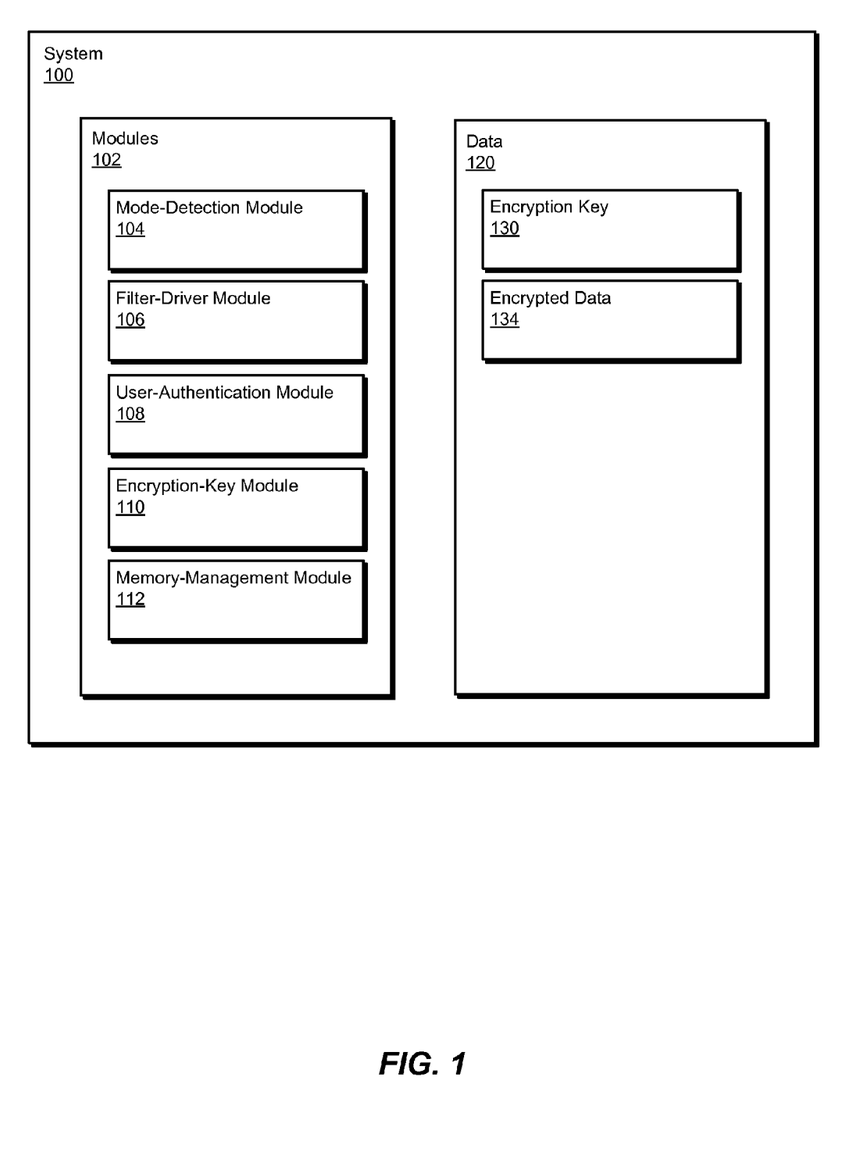
FIG. 1 is a block diagram of an exemplary system for protecting against unauthorized access of encrypted data during power-management modes.

FIG. 1 is a block diagram of an exemplary system 100 for protecting against unauthorized access of encrypted data during power-management modes. As illustrated in this figure, exemplary system 100 may include one or more modules 102 for performing one or more tasks. For example, and as will be explained in greater detail below, exemplary system 100 may include a mode-detection module 104 programmed to detect initiation of a power-management mode that suspends the functionality of at least one component of a computing device while maintaining the functionality of the computing device's memory. Exemplary system 100 may also include a filter-driver module 106 programmed to, before the computing device enters the power-management mode, (1) identify, within the memory of the computing device, an encryption key that is required to access encrypted data stored in a storage device of the computing device and then (2) remove the encryption key from the memory of the computing device in order to protect against unauthorized access of the encrypted data during implementation of the power-management mode.

In addition, and as will be described in greater detail below, exemplary system 100 may include a user-authentication module 108 programmed to receive user credentials from a user of the computing device in order to authenticate the user upon discontinuation of the power-management mode. Exemplary system 100 may further include an encryption-key module 110 programmed to, upon successful authentication of the user, use the user credentials to regenerate the encryption key in order to enable access to the encrypted data stored in the storage device. In some embodiments, exemplary system 100 may also include a memory-management module 112 programmed to store all software processes necessary to enable the computing device to (1) authenticate the user and then (2) regenerate the encryption key. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include data 120. Data 120 may represent portions of a single database or computing device or a plurality of databases or computing devices. In one embodiment, data 120 may include an encryption key 130 that facilitates performing cryptographic transformations that encrypt and/or decrypt data (e.g., encrypted data 134) stored in a storage device (e.g., storage device 206 in FIG. 2).

Data 120 in FIG. 1 may represent a portion of one or more computing devices. For example, data 120 may represent a portion of computing device 202 in FIG. 2, computing system 510 in FIG. 5, and/or portions of exemplary network architecture 600 in FIG. 6. Alternatively, data 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Figure 2:
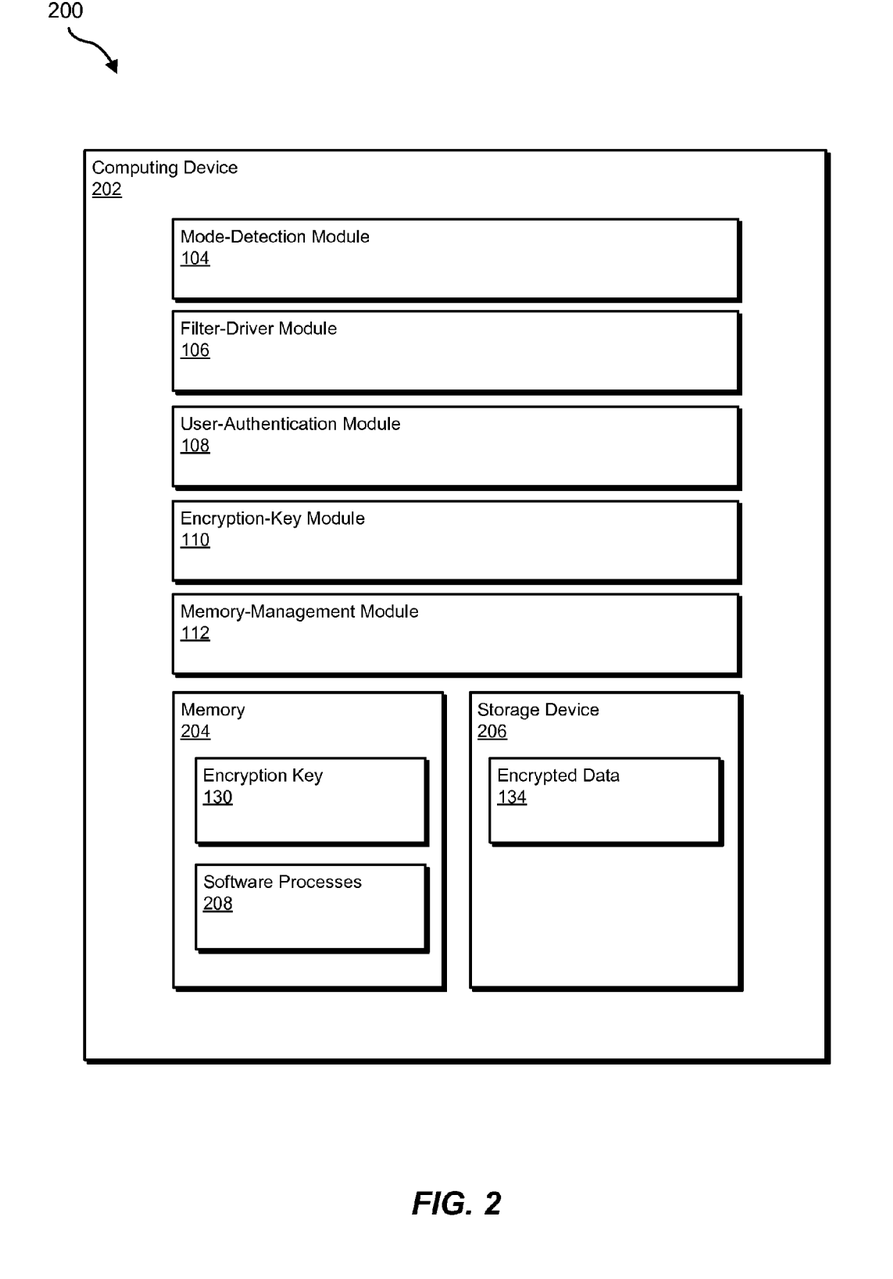
FIG. 2 is a block diagram of an exemplary system for protecting against unauthorized access of encrypted data during power-management modes.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202, one or more of modules 102, memory 204, and a storage device 206.

In one embodiment, and as will be described in greater detail below, one or more of modules 102 may be programmed to cause computing device 202 to detect initiation of a power-management mode (such as sleep states S1, S2, or S3) that suspends the functionality of at least one component of computing device 202 (such as a central processing unit) while maintaining the functionality of computing device 202's memory (e.g., memory 204). Before computing device 202 enters the power-management mode, modules 102 may then cause computing device 202 to (1) identify an encryption key (e.g., encryption key 130) within memory 204 that is required to access encrypted data (e.g., encrypted data 134) stored in a storage device of computing device 202 (e.g., storage device 206) and then (2) remove encryption key 130 from memory 204 in order to protect against unauthorized access of the encrypted data during implementation of the power-management mode. Upon detecting discontinuation of the power-management mode, modules 102 may then cause computing device 202 to re-authenticate a user of computing device 202 by (1) obtaining user credentials (such as a password, personal identification number, or smart card data) from the user and then, upon successful authentication of the user, (2) using the user credentials to regenerate the encryption key in order to enable access to encrypted data 134 stored storage device 206.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing devices.

Memory 204 generally represents any type or form of volatile or non-volatile random-access memory (RAM) device capable of storing data. Examples of memory 204 include, without limitation, RAM devices, dynamic random-access memory (DRAM) devices, static random-access memory (SRAM) devices, thyristor random-access memory (T-RAM) devices, twin transistor random-access memory (TTRAM) devices, zero capacitor random-access memory (Z-RAM) devices, magnetoresitive random-access memory (MRAM), erasable programmable read-only memory (EPROM) devices, electrically erasable programmable read-only memory (EEPROM) devices, NOR-flash memory devices, or any other suitable memory devices.

Storage device 206 generally represents any type or form of storage device capable of storing encrypted data. In some examples, storage device 206 may be a non-volatile storage device that retains encrypted data even when powered down. Examples of storage device 206 include, without limitation, hard disk drives (including so-called self-encrypting drives), optical disk drives, flash memory devices, floppy disk drives, solid-state drives, mass storage systems, or any other suitable data storage devices.

Figure 3:
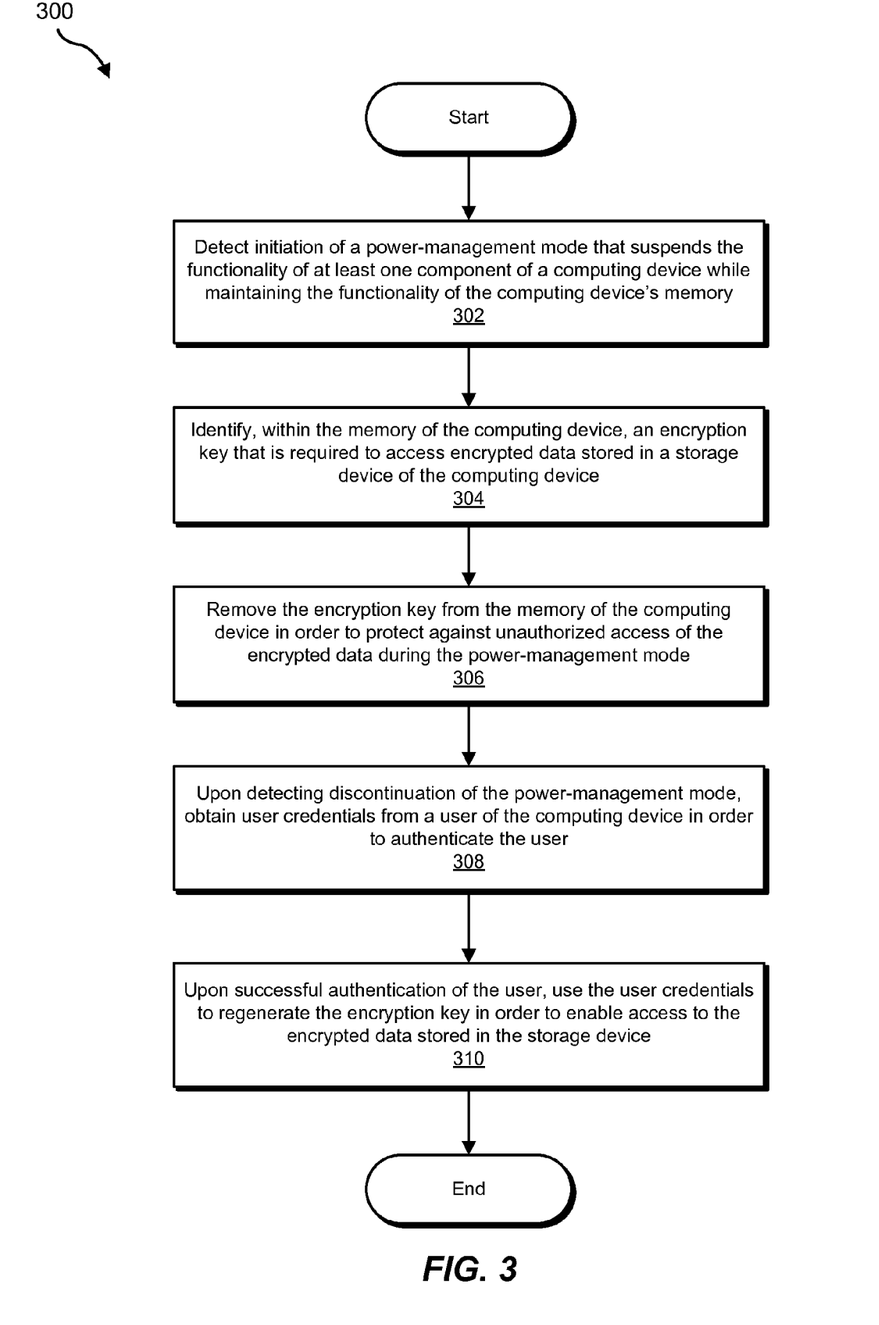
FIG. 3 is a flow diagram of an exemplary method for protecting against unauthorized access of encrypted data during power-management modes.

FIG. 3 is a flow diagram of an exemplary computer-implemented method 300 for protecting against unauthorized access of encrypted data during power-management modes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the various systems described herein may detect initiation of a power-management mode that suspends the functionality of at least one component of a computing device while maintaining the functionality of the computing device's memory. For example, mode-detection module 104 may, as part of computing device 202 in FIG. 2, detect initiation of sleep state S3, which suspends the functionality of computing device 202's central processing unit (CPU) while maintaining the functionality of memory 204.

The phrase "power-management mode," as used herein, may refer to any type or form of technique or process for saving, reducing, and/or otherwise managing the power consumption of a computing device. Examples of power-management modes include, without limitation, sleep states (also commonly referred to as standby modes) S1, S2, S3, or any other mode that suspends the functionality of at least one component of a computing device while maintaining the functionality of the computing device's memory.

In some embodiments, the power-management mode may cause computing device 202 to suspend and/or power down computing device 202's CPU. For example, sleep state S1 may, upon initiation, cause computing device 202's CPU to stop executing computer-executable instructions even though computing device 202's CPU remains powered. In another example, sleep state S2 or sleep state S3 may, upon initiation, cause computing device 202 to power down its CPU.

In certain embodiments, while the power-management mode may not cause computing device 202 to suspend the functionality of memory 204, the power-management mode may cause computing device 202 to lower the refresh rate of memory 204. In other words, the refresh rate of memory 204 may be lowered without suspending the functionality of memory 204. By lowering the refresh rate of memory 204 (in, e.g., sleep state S3), computing device 202 may reduce power consumption while maintaining the functionality of memory 204.

The various systems disclosed herein may perform step 302 in a variety of ways. In one example, mode-detection module 104 may receive an input/output request indicating that computing device 202 is initiating the power-management mode. In this example, the input/output request may be intercepted by a low-level filter driver that registers an input/output completion routine in order to obtain control over a storage device of computing device 202 during implementation of the power-management mode. This low-level filter driver may also be configured to perform various other tasks, as will be described in greater detail below.

In another example, mode-detection module 104 may be configured to detect an event that causes computing device 202 to initiate the power-management mode. Examples of such an event include, without limitation, an attempt by a user to close a display (e.g., a monitor) of computing device 202, an attempt by the user to press at least one button or switch of computing device 202, expiration of an idle timer of computing device 202, or any other event that may be configured to cause computing device 202 to initiate the power-management mode.

Returning to FIG. 3, at step 304 the systems described herein may, before the computing device enters the power-management mode, identify an encryption key within the computing device's memory that is required to access encrypted data stored in a storage device of the computing device. For example, before computing device 202 in FIG. 2 enters sleep state S3, filter-driver module 106 may identify encryption key 130 within memory 204. In this example, encryption key 130 (which may be may be a digital parameter or sequence that includes any number of bits (e.g., 128 or 256 bits)) may enable computing device 202 to access encrypted data 134 stored within storage device 206.

The systems described herein may perform step 304 in a variety of ways. In at least one embodiment, filter-driver module 106 may obtain a memory address that identifies the location where the encryption key is stored within memory 204. For example, upon storing encryption key 130 within memory 204, encryption-key module 110 may determine that encryption key 130 (or at least the first byte of encryption key 130) is stored at memory address 0x999FF within memory 204. In this example, encryption-key module 110 may then inform filter-driver module 106 that encryption key 130 (or at least the first byte of encryption key 130) is stored at memory location 0x999FF within memory 204.

Figure 4:
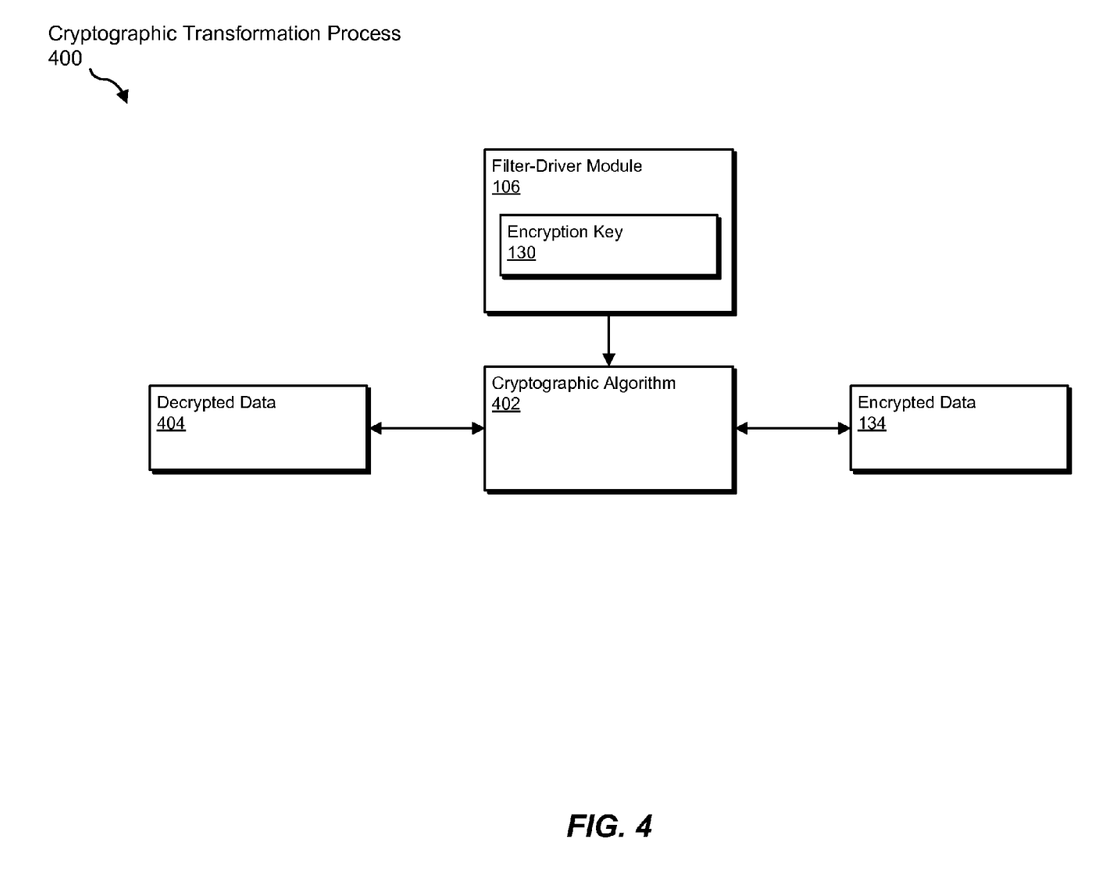
FIG. 4 is a block diagram of an exemplary cryptographic transformation process for encrypting and decrypting data.

Encryption key 130 may be used to determine the functional output of a cryptographic algorithm (e.g., cryptographic algorithm 402 in FIG. 4). In other words, encryption key 130 may facilitate encrypting and/or decrypting data stored within storage device 206. Data that has been encrypted by encryption key 130 and stored within storage device 206 may remain unintelligible until being decrypted by encryption key 130. For example, even if another component of computing device 202 attempts to access encrypted data 134, encrypted data 134 may be unintelligible unless decrypted by encryption key 130 prior to being accessed by the other component.

FIG. 4 is a block diagram of an exemplary cryptographic transformation process 400 for encrypting and decrypting data within a computing device. As illustrated in FIG. 4, filter-driver module 106 may use encryption key 130 to perform a cryptographic algorithm 402 on decrypted data 404 and/or encrypted data 134. In one example, filter-driver module 106 may use encryption key 130 to encrypt decrypted data 404 in order to generate encrypted data 134. In this example, upon producing encrypted data 134 from decrypted data 404, filter-driver module 106 may store encrypted data 134 within storage device 206.

In another example, filter-driver module 106 may access encrypted data 134 within storage device 206 and use encryption key 130 to decrypt encrypted data 134 in order to regenerate decrypted data 404. As such, cryptographic algorithm 402 may be capable of performing bidirectional cryptographic transformations that convert decrypted data 404 into encrypted data 134 and/or encrypted data 134 into decrypted data 404. Examples of cryptographic algorithm 402 may include, without limitation, digital signature algorithms, asymmetric encryption/decryption algorithms, symmetric encryption/decryption algorithms, hashing algorithms, random number generator algorithms, file or folder encryption/decryption algorithms, or any other suitable cryptographic algorithms.

In some examples, filter-driver module 106 may provide a low-level filter driver that is configured to (1) intercept read/write operations directed to storage device 206 and (2) use encryption key 130 to perform at least one cryptographic transformation (e.g., cryptographic transformation process 400 in FIG. 4) during such read/write operations. For example, computing device 202's CPU may initiate a read/write operation directed to store decrypted data 404 within storage device 206. However, in this example, a low-level filter driver may intercept the read/write operation and use encryption key 130 to encrypt decrypted data 404 (generating, e.g., encrypted data 134) prior to storing such data within storage device 206.

The term "low-level filter driver," as used herein, generally refers to any module capable of intercepting and modifying and/or transforming read/write operations directed to a storage device. In some embodiments, this low-level filter driver may be installed underneath the current disk driver as a low-level abstraction layer. In other words, the low-level filter driver may be installed as an abstraction layer that directly interacts with storage device 206. By installing the low-level filter driver underneath the current disk driver, computing device 202 may enable the low-level filter driver to intercept all read/write operations directed to storage device 206.

In other embodiments, the low-level filter driver may be installed above the current disk driver. In such embodiments, the low-level filter driver may still be capable of intercepting (or at least accessing) all read/write operations directed to storage device 206 even though the low-level filter driver only indirectly interacts with storage device 206. The low-level filter driver may use any of the cryptographic algorithms described above in connection with cryptographic algorithm 402 to perform the cryptographic transformation.

Returning to FIG. 3, at step 306 one or more of the systems described herein may remove the encryption key from the computing device's memory in order to protect against unauthorized access of the encrypted data during implementation of the power-management mode. For example, filter-driver module 106 may remove encryption key 130 from memory 204 before computing device 202 in FIG. 2 enters sleep state S3 in order to protect against unauthorized access of encrypted data 130 during implementation of sleep state S3. The phrase "unauthorized access," as used herein, may refer to any act of acquiring and/or decrypting encrypted data by any person who has not been granted authorization to acquire and/or decrypt such encrypted data.

The systems described herein may perform step 306 in a variety of ways. In one example, filter-driver module 106 may use the low-level filter driver to overwrite encryption key 130 with zeros. For example, if encryption key 130 includes 128 bits of data, filter-driver module 106 may use the low-level filter driver to overwrite these 128 bits of data with zeros, beginning at memory location 0x999FF within memory 204. By overwriting encryption key 130 with zeros, filter-driver module 106 may ensure that encrypted data 130 remains unintelligible at least until encryption key 130 is regenerated, as will be described in greater detail below.

In another example, storage device 206 may represent a self-encrypting drive. In this example, the systems described herein may, instead of overwriting an encryption key stored in computing device 202's memory, simply lock self-encrypting storage device 206 before computing device 202 enters the power-management mode. In this scenario, self-encrypting storage device 206 may provide (with the potential exception of the first few blocks of data that contain the shadow master boot record (MBR)) zeroed-out (and thus unintelligible) blocks of data in response to I/O requests directed to encrypted data stored on self-encrypting storage device 206 until a user of computing device 202 has re-authenticated himself/herself after computing device 202 exits the power-management mode.

In at least one embodiment, one or more of the systems described herein may, prior to implementation of the power-management mode, store all software processes within the computing device's memory that are necessary to enable the computing device to (1) authenticate a user and then (2) regenerate the encryption key. For example, memory-management module 112 may store, within memory 204 prior to implementation of the power-management mode, all software processes that are required to obtain user credentials from a user in order to authenticate the user and then use the user credentials to regenerate encryption key 130. By storing all of these software processes within the computing device's memory, memory-management module 112 may re-authenticate the user without accessing the computing device's underlying storage device (e.g., storage device 206).

In some examples, the systems described herein may also reduce the working set size of all non-critical processes within the computing device's memory before the computing device enters the power-management mode, thus ensuring that all non-critical memory pages are stored in encrypted form on the computing device's storage device. For example, memory-management module 112 may, prior to implementation of the power-management mode, remove (or simply reduce the working set size of) any software process from memory 204 that is not required to enable computing device 202 to (1) implement the power-management mode, (2) authenticate a user of computing device 202, (3) regenerate the encryption key, and/or (4) restore computing device 202 to a system state experienced prior to initiation of the power-management mode. In other words, prior to initiation of the power-management mode, memory-management module 112 may ensure that only those software processes that enable computing device 202 to perform the above-enumerated tasks are stored within memory 204.

In some examples, memory-management module 112 may identify software processes to be removed or reduced in size by analyzing a snapshot of computing device 202 taken prior to initiation of the power-management mode. For example, before removing (or reducing the working set size of) a software process from memory 204, memory-management module 112 may analyze an earlier snapshot of computing device 202 to ensure that this software process is not implicated in a system state that may be restored on computing device 202.

Returning to FIG. 3, at steps 308-310, the systems described herein may force a user of the computing device to re-authenticate himself/herself before allowing access to the encrypted data stored in the computing device's storage device. In particular, at step 308, upon detecting discontinuation of the power-management mode, one or more of the systems described herein may obtain user credentials from a user of the computing device in order to authenticate the user. For example, user-authentication module 108 may, as part of computing device 202 in FIG. 2, require user credentials from a user in order to ensure that the user is authorized to use computing device 202 prior to unlocking computing device 202. Examples of such user credentials include, without limitation, passwords, personal identification numbers (PINs), smart card data, voice recognition data, facial recognition data, fingerprint recognition data, iris recognition data, any other form of biometric authentication data, USB token/device data (whether encrypted or configured in plaintext), network-based authentication data (such as cellular or internet protocol (IP) identifiers), or any other suitable user credentials.

The systems described herein may perform step 308 in a variety of ways. In some embodiments, user-authentication module 108 may cause computing device 202 to display a user interface that requests the user credentials from the user of computing device 202 in order to authenticate the user. For example, user-authentication module 108 may cause computing device 202 to display a user interface that includes a text box where the user must enter the correct password in order to unlock the operating system.

In another embodiment, user-authentication module 108 may simply wait for the user to insert the user credentials into computing device 202. For example, user-authorization module 108 may wait for the user to insert, into computing device 202, a smart card that provides data identifying the user. Upon obtaining the user credentials from the user, user-authentication module 108 may compare the user credentials with verified user credentials stored within memory 204 of computing device 202. If the user credentials obtained from the user match the verified user credentials, user-authentication module 108 may determine that this attempt to authenticate the user has been successful.

At step 310 in FIG. 3, upon successful authentication of the user, one or more of the systems described herein may use the user credentials to regenerate the encryption key in order to re-enable access to the encrypted data stored in the storage device. For example, encryption-key module 110 may receive the user credentials from user-authentication module 108 and use the user credentials to regenerate encryption key 130. In this example, encryption key 130 may be identical to the encryption key that was removed by filter-driver module 106 before computing device 202 entered the power-management mode.

The systems described herein may perform step 310 in a variety of ways. In one embodiment, encryption-key module 110 may enter the user credentials as an input value into a key derivation function (such as a pseudo-random function or keyed cryptographic hash function) that regenerates encryption key 130. For example, encryption-key module 110 may enter a password obtained from the user into a keyed cryptographic hash function. In this example, the keyed cryptographic function may introduce a salt (i.e., a set of random bits) that expands the password into 128 bits (or 256 bits) of data in order to regenerate encryption key 130. Upon completion of step 310 in FIG. 3, exemplary method 300 may terminate.

As detailed above, by removing an encryption key required to access encrypted data from a computing device's memory before the computing device enters a power-management mode, the systems and methods described herein may protect against the unauthorized access of encrypted data stored on the computing device while the device is in the power-management mode. As a result, the systems and methods described herein may increase the value and effectiveness of security software by thwarting illegitimate attempts to access onboard encryption keys (and encrypted data associated with the same) while computing devices are implementing power-management modes, potentially ensuring that lost or stolen computing devices do not result in compromised data.

Figure 5:
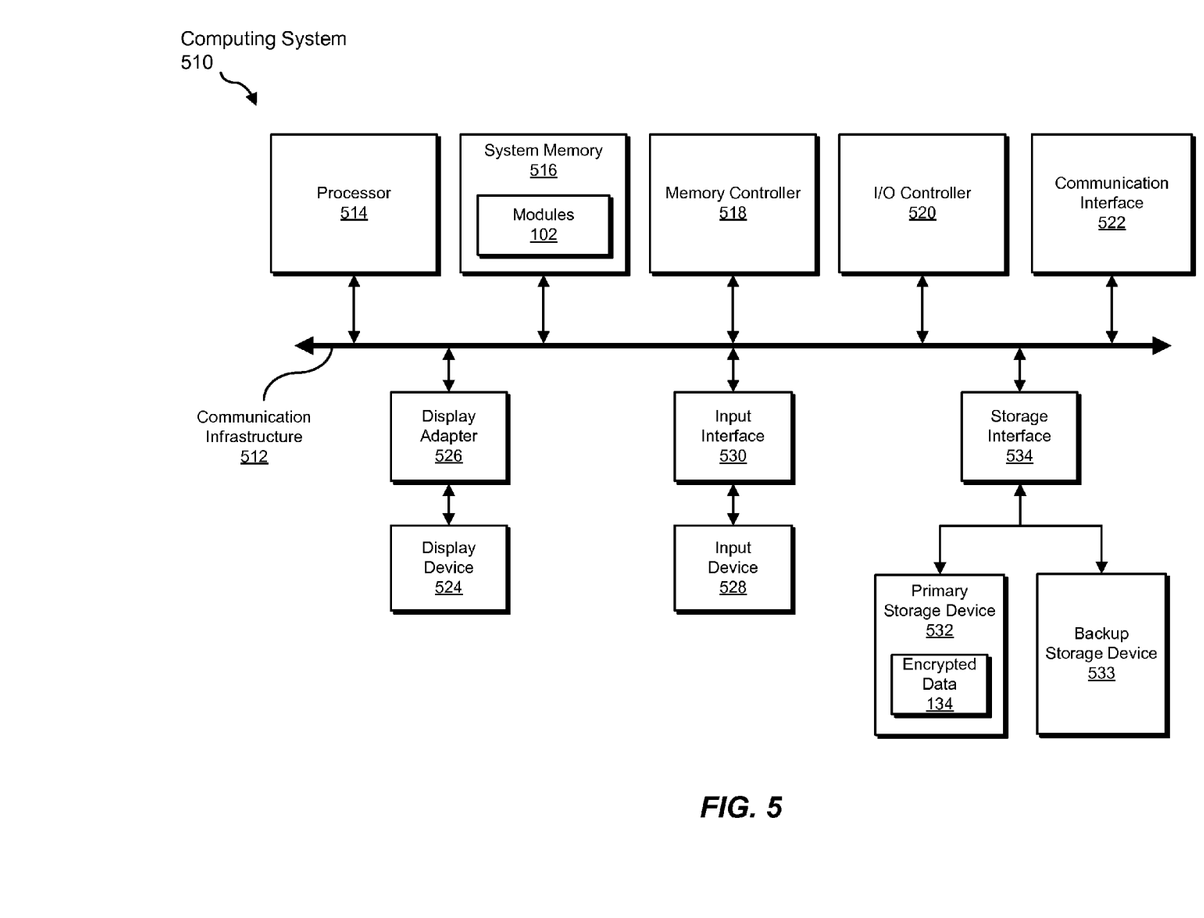
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the detecting, identifying, removing, obtaining, using, regenerating, suspending, powering down, intercepting, performing, overwriting, determining, blocking, implementing, authenticating, restoring, and storing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 and/or encryption key 130 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as detecting, identifying, removing, obtaining, using, regenerating, suspending, powering down, intercepting, performing, overwriting, determining, blocking, implementing, authenticating, restoring, and storing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the detecting, identifying, removing, obtaining, using, regenerating, suspending, powering down, intercepting, performing, overwriting, determining, blocking, implementing, authenticating, restoring, and storing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the detecting, identifying, removing, obtaining, using, regenerating, suspending, powering down, intercepting, performing, overwriting, determining, blocking, implementing, authenticating, restoring, and storing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the detecting, identifying, removing, obtaining, using, regenerating, suspending, powering down, intercepting, performing, overwriting, determining, blocking, implementing, authenticating, restoring, and storing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, encrypted data 134 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the detecting, identifying, removing, obtaining, using, regenerating, suspending, powering down, intercepting, performing, overwriting, determining, blocking, implementing, authenticating, restoring, and storing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
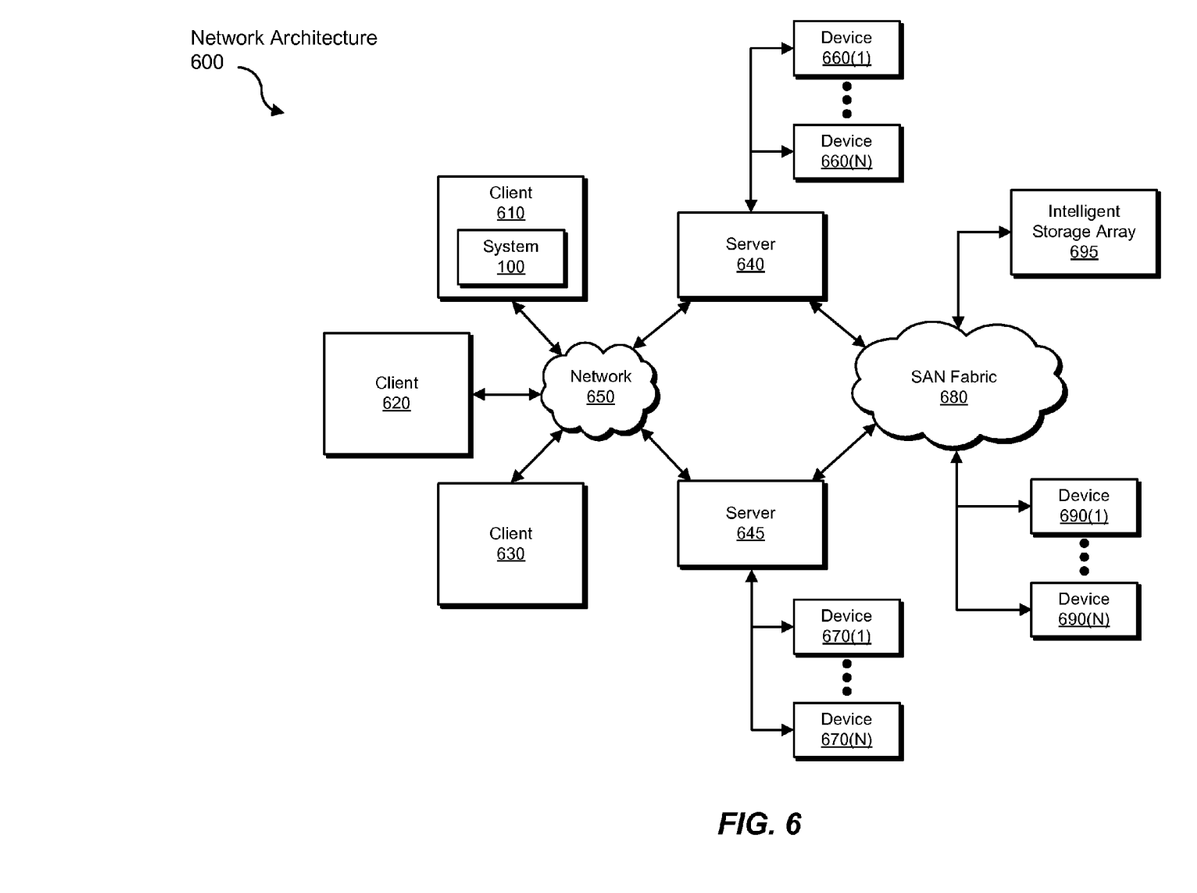
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the detecting, identifying, removing, obtaining, using, regenerating, suspending, powering down, intercepting, performing, overwriting, determining, blocking, implementing, authenticating, restoring, and storing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for protecting against unauthorized access of encrypted data during power-management modes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, encryption-key module 110 in FIG. 1 may transform a property or characteristic of computing device 202 in FIG. 2 by removing encryption key 130 from memory 204 before computing device 202 enters a power-management mode.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting against unauthorized access of encrypted data during power-management modes, at least a portion of the method being performed by a computing device comprising at least one processor, the method comprising:
   detecting initiation of a power-management mode that suspends the functionality of at least one component of the computing device while maintaining the functionality of the computing device's memory;
   before the computing device enters the power-management mode:
      identifying, within the memory of the computing device, an encryption key that is required to access encrypted data stored in a storage device of the computing device;
      removing the encryption key from the memory of the computing device in order to protect against unauthorized access of the encrypted data during implementation of the power-management mode;
   upon discontinuation of the power-management mode, obtaining user credentials from a user of the computing device in order to authenticate the user;
   upon successful authentication of the user, regenerating the encryption key based at least in part on the user credentials by entering at least a portion of the user credentials into a key derivation function that regenerates the encryption key by introducing a salt that expands the portion of the user credentials into the encryption key in order to enable access to the encrypted data stored in the storage device.

2. The method of claim 1, wherein the power-management mode comprises:
   sleep state S1;
   sleep state S2;
   sleep state S3.

3. The method of claim 1, wherein suspending the functionality of at least one component of the computing device comprises:
   suspending the computing device's central processing unit (CPU);
   powering down the computing device's CPU.

4. The method of claim 1, further comprising providing, within the computing device, a low-level filter driver that is configured to:
   intercept read/write operations directed to the storage device;
   use the encryption key to perform at least one cryptographic transformation during the read/write operations.

5. The method of claim 4, wherein removing the encryption key from the memory of the computing device comprises using the low-level filter driver to overwrite the encryption key with zeros.

6. The method of claim 1, wherein the user credentials comprise at least one of:
   a password of the user;
   a personal identification number (PIN) of the user;
   smart card data that identifies the user.

7. The method of claim 1, further comprising storing, within the memory of the computing device prior to implementation of the power-management mode, all software processes necessary to enable the computing device to:
   authenticate the user;
   regenerate the encryption key.

8. The method of claim 1, further comprising removing, from the memory of the computing device prior to implementation of the power-management mode, all software processes that are not required to enable the computing device to:
   implement the power-management mode;
   authenticate the user;
   regenerate the encryption key;
   restore the computing device to a system state experienced by the computing device prior to initiation of the power-management mode.

9. A system for protecting against unauthorized access of encrypted data during implementation of a power-management mode, the system comprising:
   a mode-detection module programmed to:
      detect initiation of a power-management mode that suspends the functionality of at least one component of a computing device while maintaining the functionality of the computing device's memory;
   a filter-driver module programmed to, before the computing device enters the power-management mode:
      identify, within the memory of the computing device, an encryption key that is required to access encrypted data stored in a storage device of the computing device;
      remove the encryption key from the memory of the computing device in order to protect against unauthorized access of the encrypted data during implementation of the power-management mode;
   a user-authentication module programmed to, upon discontinuation of the power-management mode, receive user credentials from a user of the computing device in order to authenticate the user;
   an encryption-key module programmed to, upon successful authentication of the user, regenerate the encryption key based at least in part on the user credentials by entering at least a portion of the user credentials into a key derivation function that regenerates the encryption key by introducing a salt that expands the portion of the user credentials into the encryption key in order to enable access to the encrypted data stored in the storage device;
   at least one processor configured to execute the mode-detection module, the filter-driver module, the user-authentication module, and the encryption-key module.

10. The system of claim 9, wherein the power-management mode comprises:
    sleep state S1;
    sleep state S2;
    sleep state S3.

11. The system of claim 9, wherein the power-management mode suspends the functionality of at least one component of the computing device by:
    suspending the computing device's central processing unit (CPU);
    powering down the computing device's CPU.

12. The system of claim 9, wherein the filter-driver module is further programmed to:
    intercept read/write operations directed to the storage device;
    use the encryption key to perform at least one cryptographic transformation during the read/write operations.

13. The system of claim 9, wherein the filter-driver module is further programmed to overwrite the encryption key with zeros.

14. The system of claim 9, wherein the user credentials comprise at least one of:
    a password of the user;
    a personal identification number (PIN) of the user;
    smart card data that identifies the user.

15. The system of claim 9, further comprising a memory-management module programmed to store, within the memory of the computing device prior to implementation of the power-management mode, all software processes necessary to enable the computing device to:
    authenticate the user;
    regenerate the encryption key.

16. The system of claim 9, further comprising a memory-management module programmed to remove, from the memory of the computing device prior to implementation of the power-management mode, all software processes that are not required to enable the computing device to:
    implement the power-management mode;
    authenticate the user;
    regenerate the encryption key;
    restore the computing device to a system state experienced by the computing device prior to initiation of the power-management mode.

17. A non-transitory computer-readable-storage medium comprising one or more computer-executable instructions that, when executed by at least one processor of a computing device, cause the computing device to:
    detect initiation of a power-management mode that suspends the functionality of at least one component of the computing device while maintaining the functionality of the computing device's memory;
    before the computing device enters the power-management mode:
       identify, within the memory of the computing device, an encryption key that is required to access encrypted data stored in a storage device of the computing device;
       remove the encryption key from the memory of the computing device in order to protect against unauthorized access of the encrypted data during implementation of the power-management mode;
    upon discontinuation of the power-management mode, receive user credentials from a user of the computing device in order to authenticate the user;
    upon successful authentication of the user, regenerate the encryption key based at least in part on the user credentials by entering at least a portion of the user credentials into a key derivation function that regenerates the encryption key by introducing a salt that expands the portion of the user credentials into the encryption key in order to enable access to the encrypted data stored in the storage device.

18. The non-transitory computer-readable-storage medium of claim 17, wherein the power-management mode comprises:

sleep state S1;
sleep state S2;
sleep state S3.

19. The non-transitory computer-readable-storage medium of claim 17, wherein the one or more computer-executable instructions, when executed by the computing device, further cause the computing device to store, within the memory of the computing device prior to implementation of the power-management mode, all software processes necessary to enable the computing device to:
  authenticate the user;
  regenerate the encryption key.

* * * * *